United States Patent [19]

Yukawa

[11] Patent Number: 5,682,440
[45] Date of Patent: Oct. 28, 1997

[54] METHOD OF EXTRACTING PIXELS CONSTITUTING INTENSITY CHANGES IN AN IMAGE AND METHOD OF IDENTIFYING COLLECTION OF INTENSITY CHANGES

[75] Inventor: Noriaki Yukawa, Nara-ken, Japan

[73] Assignee: Matsushita Electric Industrial Co., Ltd., Kadoma, Japan

[21] Appl. No.: 424,574

[22] Filed: Apr. 17, 1995

Related U.S. Application Data

[63] Continuation of Ser. No. 117,535, Sep. 7, 1993, abandoned.

[30] Foreign Application Priority Data

Sep. 7, 1992 [JP] Japan .................................. 4-238001

[51] Int. Cl.⁶ .................................................... G06K 9/56
[52] U.S. Cl. .................................................... 382/205
[58] Field of Search .................................. 382/199, 205, 382/272, 278, 282

[56] References Cited

U.S. PATENT DOCUMENTS

| | | | |
|---|---|---|---|
| 4,555,798 | 11/1985 | Broadbent, Jr. et al. | 382/205 |
| 4,868,884 | 9/1989 | Miyazaki et al. | 382/22 |
| 5,031,226 | 7/1991 | Delange | 382/25 |
| 5,031,227 | 7/1991 | Raasch et al. | 382/22 |
| 5,041,912 | 8/1991 | Schlig et al. | 382/27 |
| 5,115,476 | 5/1992 | Ito | 382/22 |
| 5,115,477 | 5/1992 | Groezinger | 382/48 |
| 5,129,009 | 7/1992 | Lie Bean | 382/22 |
| 5,151,953 | 9/1992 | Landeta | 382/27 |
| 5,233,670 | 8/1993 | Dufour et al. | 382/205 |

*Primary Examiner*—Jose L. Couso
*Attorney, Agent, or Firm*—Wenderoth, Lind & Ponack

[57] ABSTRACT

A method for extracting pixels constituting an intensity change formed of a collection of local intensity changes present in a gray image of an object based on a intensity data of each pixel includes the steps of: photographing the object by an image photographing device to obtain the gray image of the object represented by the intensity data of pixels; setting a partial image with a predetermined shape and a predetermined size in the image which has a target pixel whose entire periphery is surrounded by adjacent pixels; calculating intensity data belonging to a specific area composed of the target pixel and peripheral pixels and intensity data belonging to its remaining area for the partial image; obtaining a ratio of the calculating results between the intensity data belonging to the specific area and the intensity data of the remaining area, and comparing the obtained ratio with a threshold value, and then determining suitability of the target pixel as a composing factor of the intensity change based on a compared result, and then extracting pixels constituting the intensity change which have been determined to be suitable.

19 Claims, 7 Drawing Sheets

Fig.11
PRIOR ART
| 100 | 100 | 100 | 100 | 100 |
|---|---|---|---|---|
| 100 | 200 | 200 | 200 | 100 |
| 100 | 200 | 200 | 200 | 100 |
| 100 | 200 | 200 | 200 | 100 |
| 100 | 100 | 100 | 100 | 100 |
INTENSITY DATA OF PARTIAL IMAGE 90
Fig.12
PRIOR ART
| 50 | 50 | 50 | 50 | 50 |
|---|---|---|---|---|
| 50 | 100 | 100 | 100 | 50 |
| 50 | 100 | 100 | 100 | 50 |
| 50 | 100 | 100 | 100 | 50 |
| 50 | 50 | 50 | 50 | 50 |
INTENSITY DATA OF PARTIAL IMAGE 92
Fig.13
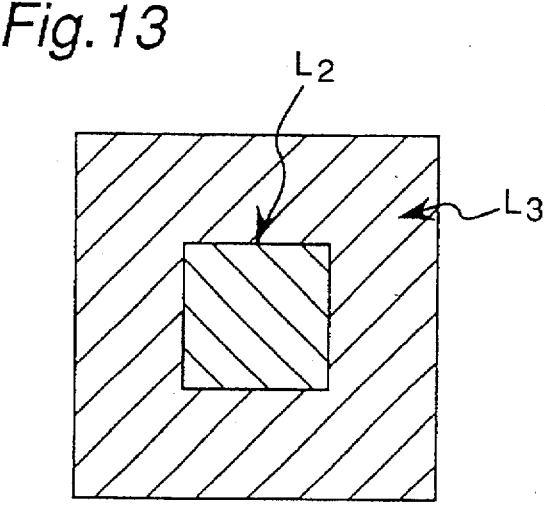
Fig.14
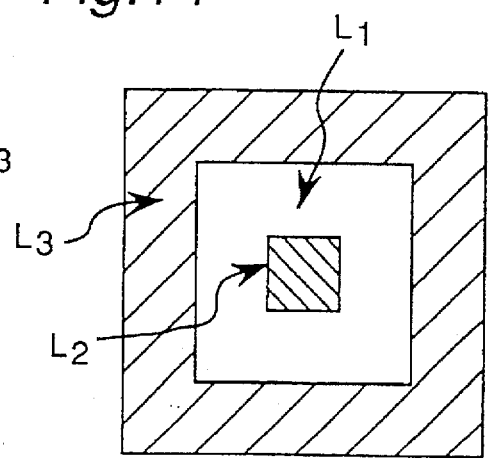

METHOD OF EXTRACTING PIXELS CONSTITUTING INTENSITY CHANGES IN AN IMAGE AND METHOD OF IDENTIFYING COLLECTION OF INTENSITY CHANGES

This application is a continuation of now abandoned application, Ser. No. 08/117,535, filed Sep. 7, 1993

BACKGROUND OF THE INVENTION

The present invention, used in a system for locating point defects on the surface of an electronic component such as a liquid crystal panel, a CRT panel or the like in a manufacturing line, relates to a method for extracting pixels constituting an intensity change resulting from a point defect on the basis of the intensity data of each pixel of a gray image of the electronic component, and a method for identifying a collection of intensity changes due to the point defect on the surface of the electronic component based on the pixels extracted by the above-noted extracting method.

In order to detect pixels constituting the intensity changes in an image, conventionally, the difference of the intensity data of pixels in the periphery of a collection of intensity changes is calculated and then compared with a threshold value.

Two examples of a conventional extracting method are depicted with reference to FIGS. 9–14.

FIG. 9 is a diagram showing the coordinate position of each pixel of an image of a to-be-inspected object in the X and Y directions and the intensity data a11–a65, A761–A1110 of the pixels.

According to a first example of the conventional method, referring to intensity data of FIG. 9, a threshold value is first set, and pixels having the density data not smaller than the threshold value are extracted and then marked by a "1". Then, pixels having intensity data smaller than the threshold value are extracted and then represented by a "0". All the pixels are digitized. An area where the pixels denoted by "1" are present is assumed to have an intensity change. In this method, even pixels which are not necessary for the identification are erroneously mixed, causing the identification to be complicated. For instance, when there is only one pixel which has considerably different intensity data than the peripheral pixels for some reason, e.g., noise or the like, the pixel is denoted by a "1" and is therefore subjected to an identification unnecessarily because of the lack of suitability as a constituting factor of the intensity change.

For solving the aforementioned inconvenience, a recent method proposes that only pixels having a high suitability as the constituting factor of the intensity change be extracted.

In a second example of the conventional method, in FIG. 9, a partial image 90 composed of a target pixel a33 and its peripheral 24 pixels, i.e., a11–a23, a43–a55 is set. Thereafter, the difference between the intensity data of pixels present in an area including the target pixel a33 and the intensity data of pixels in the other area within the partial image 90 is calculated, and then compared with a threshold value in a filtering process. Pixels constituting the intensity change in the image are detected in this manner.

The filtering process in the above-noted second prior art method is described as follows with reference to FIG. 10. FIG. 10 indicates a coefficient matrix to be used in the filtering process. In the coefficient matrix of five rows and five columns, each of the pixels having the intensity data "16" is multiplied by the coefficient "16" and then added to each other, and each pixel having the intensity data "–9" is multiplied by the coefficient "9" and then added to each other. Then, the latter is subtracted from the former. These coefficients "16" and "9" are determined in accordance with the number of pixels to be calculated among the 25 pixels in the partial image.

The calculation of the partial image 90 results as follows when the coefficient matrix of FIG. 10 is used: Calculating result=[a22+a23+a24+a32+a34+a42+a43+a44]×16−[a11+ a12+a13+a14+a15+a21+a25+a31+a35+a41+a45+a51+a52+ a53 +a54+a55]×9

The suitability as the constituting factor of the intensity change is determined from the size of the obtained calculating result, namely, whether the result is large or small.

If the calculating result is not smaller than a threshold value, the target pixel a33 is extracted as suitable for the constituting factor of the intensity change. Since the intensity data of a plurality of pixels is used in the calculation according to the second example, even in the case where only one pixel having greatly different intensity data from the peripheral pixels because of noise is present, the pixel is not extracted as the constituting factor of the intensity change.

When the partial image 90 is finished through the filtering process, the image is shifted by one pixel laterally. The pixels a11, a21 . . . a51 are removed, and instead of these pixels, pixels a16, a26 . . . a56 are added at the right of the partial image 90. That is, a new partial image 91 is set. After the same process is executed, the image is shifted again by one pixel to repeat the above procedure. The extracting process is carried out in the above-described manner.

According to the extracting method as described above, since a factor contributory to a collection of intensity changes is also taken into consideration during the identification, it is smoothly performed based on the extracted pixels to identify a collection of intensity changes.

However, the second example of the conventional extracting method is disadvantageous as described below. For example, with reference to FIG. 9, when the intensity data of pixels belonging to the partial images 90 and 92 are respectively represented as shown in FIGS. 11 and 12, the intensity data at the central part of each partial image is different as much as twice that at the peripheral part of the partial image, i.e., there appears a high contrast (gray difference) between the central part and peripheral part of the partial image. Although the contrast is visually noticeable, since the calculating result of the central part of the partial image 92 is only 7200 whereas that of the partial image 90 is 14400 which is twice 7200, it may happen depending on the level of the threshold value that the partial image 92 is not extracted.

The case where the image shows a gradual intensity change as a whole is referred to as "a broad intensity change" hereinafter. On the other hand, the intensity change to be extracted in the present invention will be described as "a local intensity change" hereinbelow. For example, if there is both a local intensity change and also a broad intensity change in the partial images 90 and 92, the latter being caused by the illuminating condition or a multi-colored surface of the to-be-inspected object, the images represent the gradual intensity change. In other words, it is necessary for the purpose of proper inspection of the to-be-inspected object to correctly detect the presence of the local intensity change in the partial image even in the presence of the broad intensity change, and then to extract the target pixel of the partial image as being the constituting factor of the intensity change.

It is possible to extract the target pixel in each of the partial images 90 and 92 as being the constituting factor of the intensity change if the threshold value is set so as to be small. However, a partial image having a broad intensity change close to the partial image 90 has high intensity data and therefore, the difference of the intensity data becomes high so as to exceed the threshold value, whereby even the target pixel of the partial image which is not the constituting factor of the density change is erroneously extracted. Although the threshold value may be changed automatically for every area in accordance with the degree of the broad intensity change, once a routine to realize the automatic change of the threshold value is incorporated to eliminate the influences of the broad intensity change, the processing algorithm becomes very complicated and takes too much time in the extracting stage, and accordingly is not practically useful.

SUMMARY OF THE INVENTION

Accordingly, an object of the present invention is to provide a method for extracting pixels constituting the intensity change resulting from a local intensity change in an image of a to-be-inspected object having a broad intensity change, without being adversely influenced by the broad intensity change nor using a complicated algorithm, and a method for identifying a collection of local intensity changes in the image.

In accomplishing the object, according to a first aspect of the present invention, there is provided a method for extracting pixels constituting an intensity change formed of a collection of local intensity changes present in a gray image of an object based on intensity data of each pixel, the method comprising steps of: setting a partial image with a predetermined shape and a predetermined size in the image which has a target pixel whose entire periphery is surrounded by adjacent pixels; calculating intensity data belonging to a specific area of the partial image composed of the target pixel and peripheral pixels and intensity data belonging to the remaining area of the partial image; obtaining a ratio of the calculating results between the intensity data belonging to the specific area of the partial image and the intensity data of the remaining area of the partial image; and comparing the obtained ratio with a threshold value, and then determining the suitability of the target pixel as a composing factor of the intensity change based on a compared result, and then extracting pixels constituting the intensity change and determined to be suitable.

In the first aspect of the present invention, not only can an image obtained by photographing the surface of a liquid crystal panel, a CRT panel or the like by an image photographing device such as a video camera be used, but a completely artificial image can be used.

Moreover, as the partial image, a square partial image composed of a target pixel and the surrounding 24 pixels (in 5×5 matrix) is generally used, but the size and the shape may be different, for instance, a rectangular or a circular partial image may be employed. Although the target pixel is located at the center of the partial image, in some cases, the target pixel may not be exactly in the center of the partial image, e.g., when the partial image set is composed of 4×3 pixels. The present invention is applicable to such case as above. As shown in FIG. 13, a specific area L2 and the remaining area L3 are disposed in the partial image. Besides, an area L1 of a dead zone where no processing is to be effected may be arranged as indicated in FIG. 14, whereby the calculating time and cost are reduced. The size of the area L1 may be larger than that of the area L2 or L3.

In order to obtain the calculating result from the intensity data of pixels in the partial image, there are methods such as (1) calculating the average value; (2) selecting the mode (i.e.—the value occurring most frequently in a series of observations or statistical data); (3) selecting the maximum and minimum values respectively for the specific area and the remaining area, etc. Generally, the average value is calculated. Since the obtained ratio is inverted depending on whether the image is positive or negative, or which value the denominator is, the threshold value and the relationship at the comparing time of the ratio with the threshold value may be set depending on conditions.

In the method of detecting the intensity changes according to the first aspect of the present invention, the partial image composed of the target pixel and the peripheral pixels is set, and the ratio of the calculating result obtained from the intensity data of the specific area in the partial image to the calculating result obtained from the intensity data of the remaining area is obtained, and the suitability of the target pixel as the constituting factor of the intensity changes is determined based on the obtained ratio. Since the detecting method employs the ratio of the calculating results, the influences of the broad intensity changes of the image are eliminated, the reason for which being described below.

The influences of the broad intensity changes operate, whether they are large or small, as a coefficient ($\alpha$) with respect to all the intensity data of pixels belonging to the partial image. For example, if the maximum intensity data of the intensity data of pixels belonging to the specific area including the target pixel is M=$\alpha$m and the minimum intensity data of the intensity data of pixels belonging to the remaining area is N=$\alpha$n, then the ratio is M/N=$\alpha$m/$\alpha$n=m/n, that is, the coefficient $\alpha$ of the influences of the broad intensity changes has no effect on the ratio of the intensity data. This is also true also for an average value or a mode. It is accordingly possible to extract necessary pixels positively even from an image having broad intensity changes without being influenced by the broad intensity changes. Moreover, a complicated processing algorithm is not needed to only obtain the ratio.

As described hereinabove, the suitability and the directional property of the target pixel are determined from the intensity ratio while the influences of the broad intensity changes are removed. Moreover, since the intensity data of pixels in the periphery of the target pixel is also added, a partial image that indicates high intensity data only at the target pixel is not extracted as being suitable, thereby ensuring the correct extraction.

According to a second aspect of the present invention, there is provided a method for extracting pixels constituting an intensity change formed of a collection of local intensity changes present in a gray image of an object based on intensity data of each pixel and then identifying, in the extracted pixels, a group of contiguous pixels constituting the intensity change present as a collection of intensity changes, the method comprising steps of: setting a partial image with a predetermined shape and a predetermined size in the image which has a target pixel whose entire periphery is surrounded by adjacent pixels; calculating intensity data belonging to a specific area of the partial image composed of the target pixel and peripheral pixels and intensity data belonging to its remaining area of the partial image; obtaining a ratio of the calculating results between the intensity data belonging to the specific area of the partial image and the intensity data of the remaining area of the partial image; and comparing the obtained ratio with a threshold value, and then determining suitability of the target pixel as a composing factor of the intensity change based on a compared result, and then extracting pixels constituting the intensity change and determined to be suitable; detecting, in the extracted pixels constituting the intensity change, the group of contiguous pixels which are contiguously present; and identifying a group of at least a predetermined number of contiguous pixels in the detected group as the collection of intensity change.

In the second aspect of the present invention, since a determination is made that the pixels constituting the intensity change are present in the image only when at least a predetermined number of adjacent pixels are contiguously present, so as to enhance the accuracy of the determination. The predetermined number referred to above is generally 3 or more although it differs depending on the kind, magnification, or intensity of the image.

When the intensity change is found in the image, at least two target pixels are contiguously present in the intensity change, and the target pixels are determined to be the constituting factor of the intensity change. Since the contiguity of the extracted pixels is detected as above in the extracting method of the second aspect of the present invention, the proper determination of the pixels being the constituting factor of the intensity change can be easily performed. However, as the intensity change is of a size, it is more preferable to determine the presence of the intensity change in the image only when not smaller than a predetermined number of target pixels are contiguously present corresponding to the size of the intensity change.

It is naturally possible to correctly decide the local intensity change irrespective of the broad intensity change.

BRIEF DESCRIPTION OF THE DRAWINGS

These and other objects and features of the present invention will become clear from the following description taken in conjunction with one preferred embodiment thereof with reference to the accompanying drawings, in which:

FIG. 11 is a diagram of the intensity data of the partial image used in the description of the prior art;

FIG. 12 is a diagram of the intensity data of the partial image used in the description of the prior art;

FIG. 13 is a diagram of a calculating area of the partial image in the embodiment of the present invention; and FIG. 14 is a diagram of a calculating area of the partial image in the embodiment of the present invention.

DETAILED DESCRIPTION OF THE PREFERRED EMBODIMENT

Figure 1:
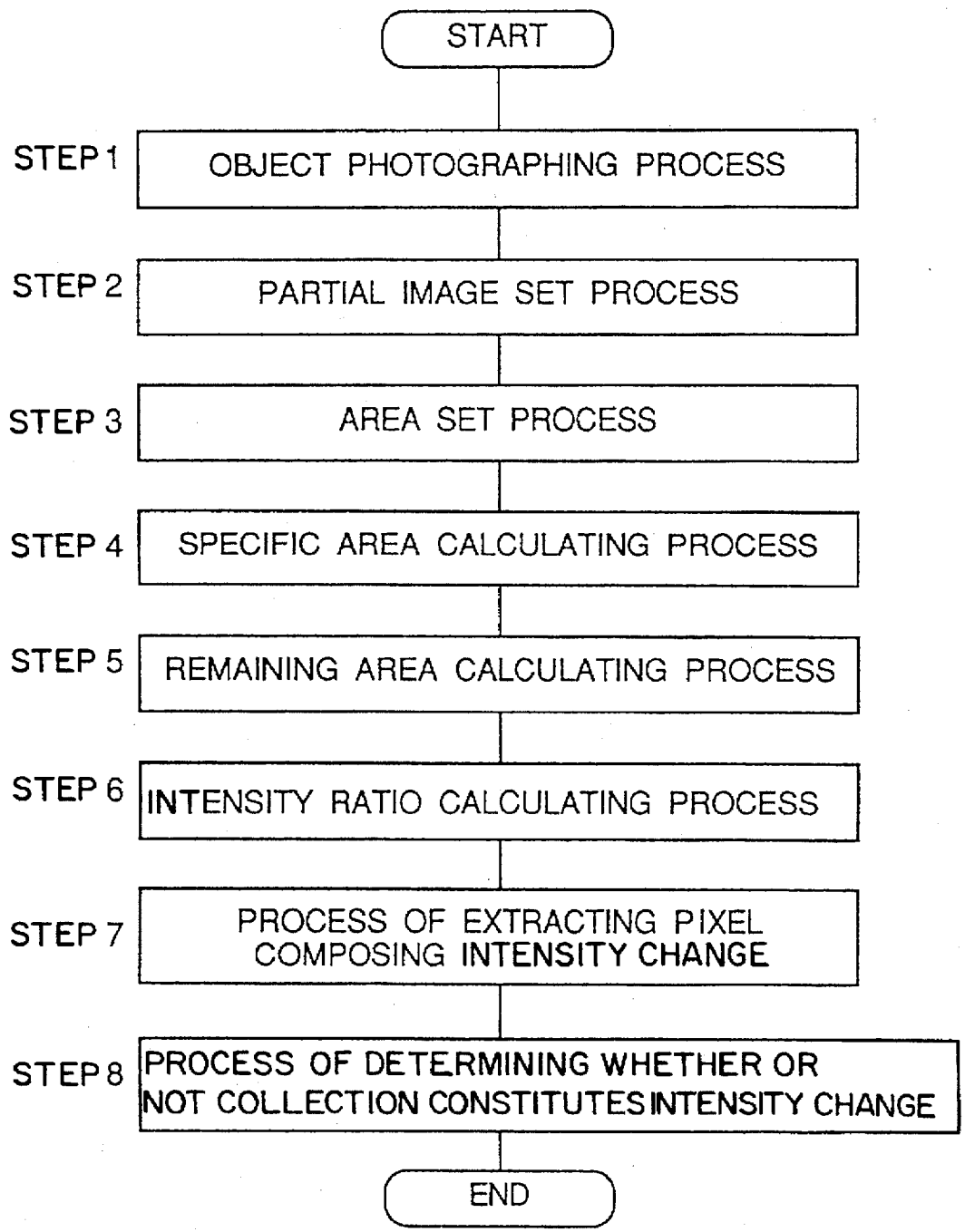
FIG. 1 is a flowchart of an extracting method according to a preferred embodiment of the present invention.

Before the description of the present invention proceeds, it is to be noted that like parts are designated by like reference numerals throughout the accompanying drawings.

The present invention will be described hereinbelow taken in conjunction with one preferred embodiment thereof. It is to be noted here that the present invention is not restricted to the embodiment below.

FIG. 1 is a flowchart of an extracting method and a deciding method of an embodiment of the present invention, including steps 1–8.

Figure 2:
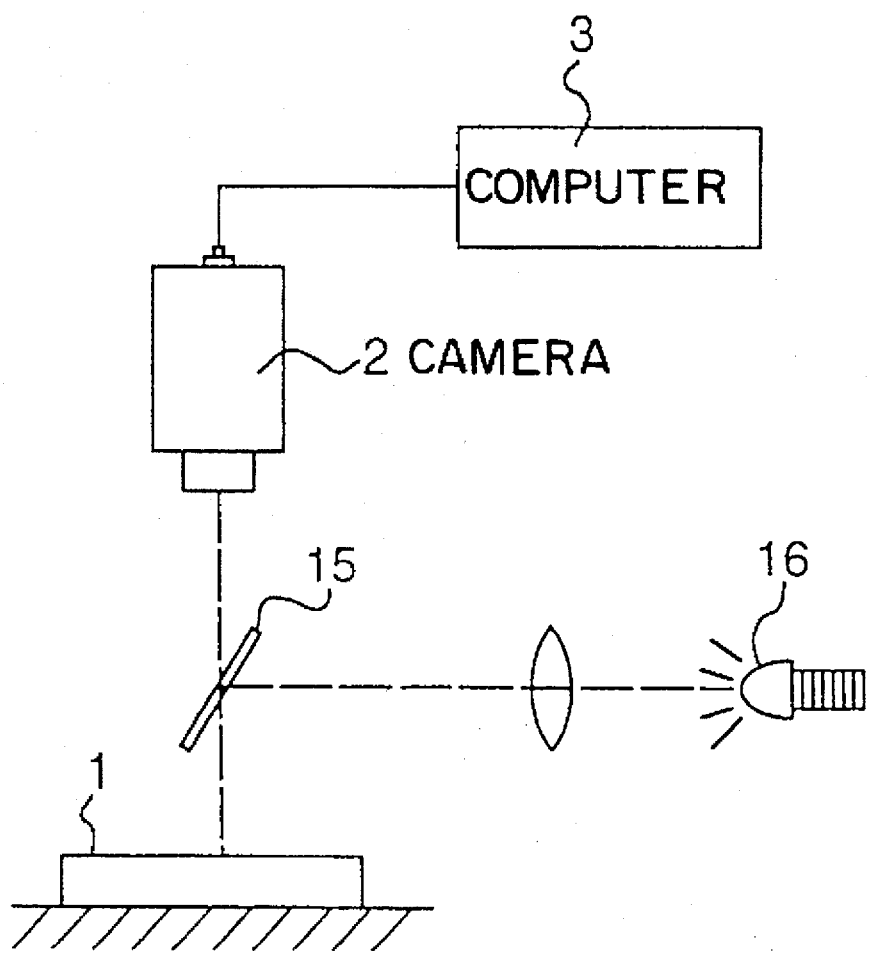
FIG. 2 is a structural diagram of a device to be used in the embodiment of FIG. 1.
Figures 3, 4:
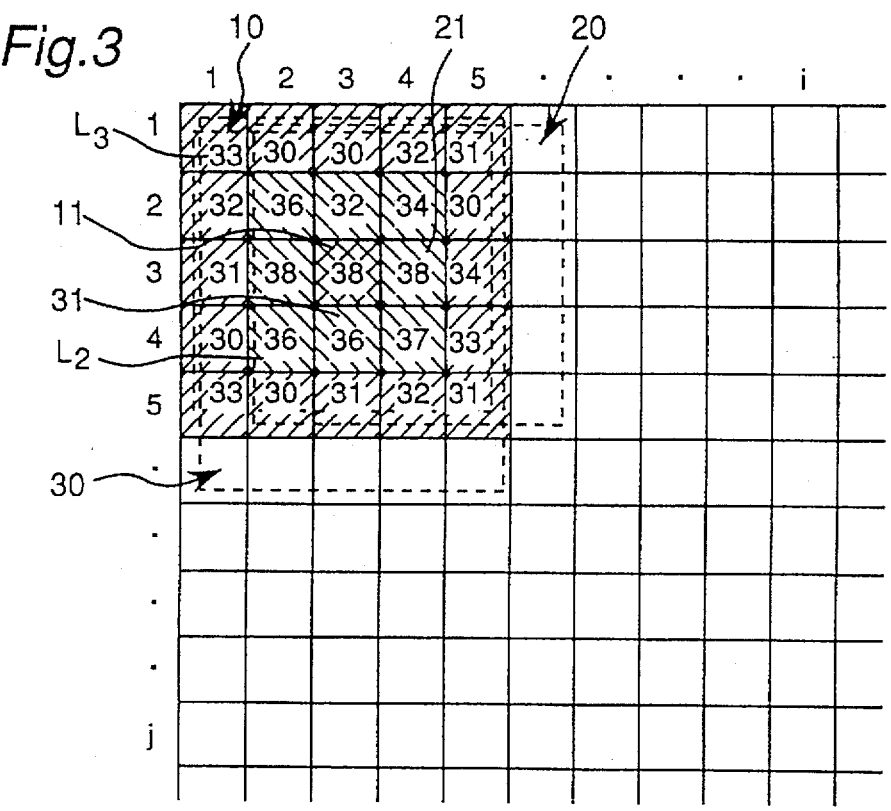
FIG. 3 is a diagram of a partial image in the embodiment of FIG. 1.
FIG. 4 is a diagram explanatory of pixels extracted as the constituting factor of the intensity change.

In FIG. 1, a intensity data indicative of the gray degree of each pixel of an image of a to-be-inspected object is formed in an object photographing process of step #1. As illustrated in FIG. 2, light from a light source 16 is irradiated upon the surface of the component 1 via a half mirror 15, so that the surface of the component 1 is photographed by a video camera 2 via the half mirror 15. The video camera 2 is provided with a CCD sensor, obtaining gray signals for each pixel. The signals are sent to a computer 3 in the digital form, and stored in a memory part as the intensity data of, e.g., 8 bits in a manner to correspond to the row and column of each pixel as indicated in FIG. 3. Needless to say, a program to execute processes described below is set in the computer 3.

Then, a partial image set process in step #2, namely, setting of a partial image is carried out. In the embodiment, as shown in FIG. 3, the set partial image 10 is composed of 5×5 pixels, namely, 25 pixels in total. An area is set based on an optional shape and an optional size predetermined in step #3. More specifically, the center of the partial image is used as a target pixel, and nine pixels including and centering the target pixel are set as a specific area L2. The remaining 16 pixels in the outer periphery of the specific area L2 are set as an area L3. The average value is calculated in this embodiment. The first target pixel is represented by 11 in FIG. 3 at the third row and the third column in the partial image 10 because a pixel of the most peripheral pixels is not surrounded by pixels at its whole periphery. The average value AV1 of the intensity data of pixels belonging to the specific area L2 is calculated in step #4 for the target pixel 11, and then, the average value AV2 of the intensity data of pixels belonging to the remaining area L3 is obtained in step #5. The ratio of the average values AV1, AV2, i.e., AV1/AV2 is calculated in step #6. In the case of the partial image 10, AV1=(36+32+34+38+38+38+36+36+37)/9= 36.11, and AV2=(33+30+30+32+31+30+34+33+31+32+31+ 30+33+30+31 +32)/16=31.44, and therefore the ratio is 36.11/31.44=1.15. In an extracting process in step #7 of the embodiment, the target pixel 11 is extracted because of the suitability as the composing factor of the intensity change if a threshold value is set to be 1.10 which is arbitrarily determined by operator's experience.

When the extracting process of the partial image 10 is finished, the image is shifted laterally by one pixel and a new partial image 20 having a target pixel 21 at the center thereof is set for the same processes as above. The procedure is repeated thereafter. When the partial image with the pixel next to the right end of the image is completely processed, the process is started similarly again from a partial image one stage lower than the partial image 10, that is, a partial image 30 having a target pixel 31. The target pixels to be extracted are marked by "1", while the target pixels not to be extracted are denoted by "0".

After the extracting process in step #7, the intensity change present in the image is determined in a mass deciding process of step #8. The extracted target pixels subsequent to the extracting process are, for example, as indicated in FIG. 4 wherein the blank represents "0".

If the image has an intensity change, at least two target pixels are often contiguously present in the intensity change.

Figure 5:
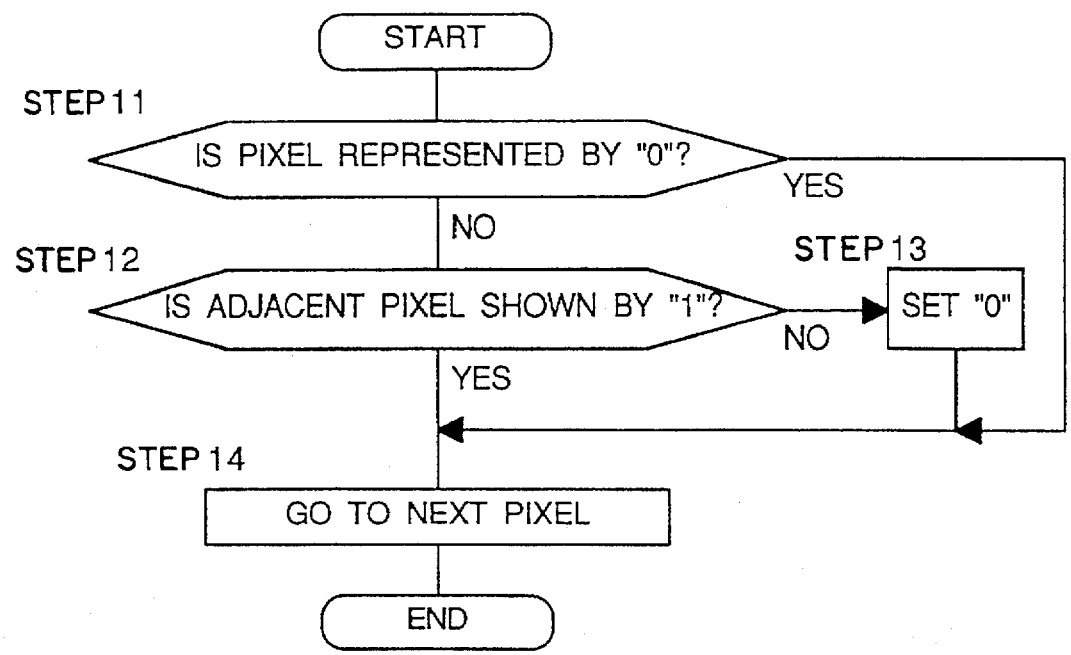
FIG. 5 is a flowchart of a process when the density border is determined in the embodiment.

Therefore, if the target pixel extracted to be suitable as the composing factor of the intensity change assumes contiguity with the adjacent pixel, it is determined that these pixels constitute an intensity change in the image. That is, it is enough to detect an intensity change when at least two target pixels are adjacent to each other. The details are discussed below with reference to a flowchart of FIG. 5.

Figure 6:
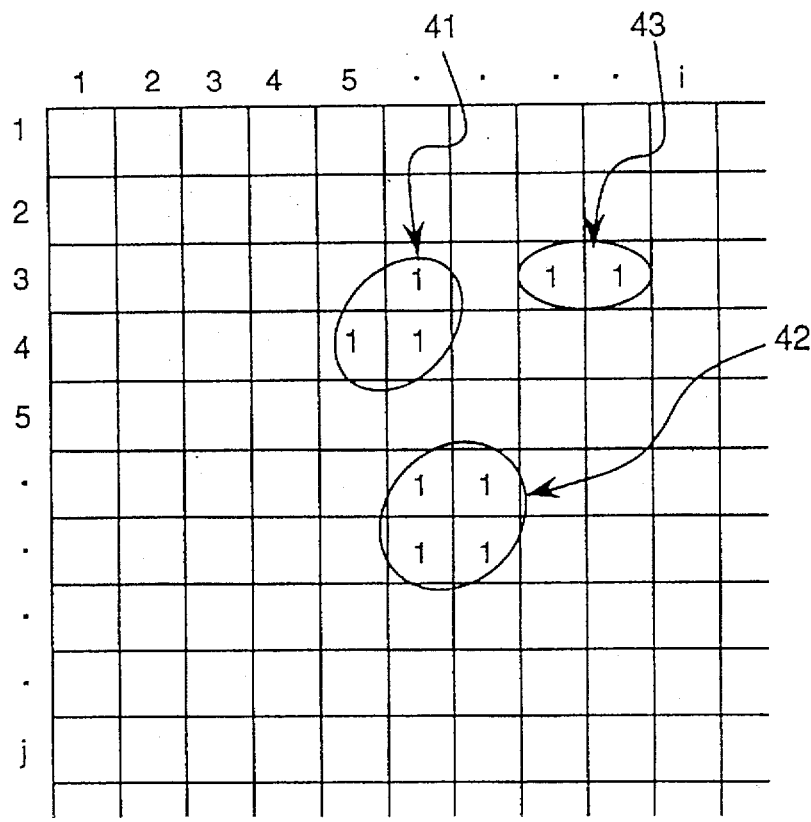
FIG. 6 is a diagram explanatory of the state after the process of FIG. 5.

When the pixel is represented by "0" at step #11, the pixel is skipped and the next pixel is processed at step #14. If the pixel indicates "1" at step #11, a determination is made as to whether or not the adjacent pixel is a pixel showing a "1" at step #12. If there is no adjacent pixel showing a "1", the pixel is changed to be expressed by a "0" at step #13, and then the program proceeds to step #14. On the other hand, if the adjacent pixel is a "1" at step #12, it is left as is, that is, the pixel is not changed to a "0", and then the next pixel is processed at step #14. As a result of this procedure, pixels constituting the intensity changes 41–43 are extracted as shown in FIG. 6.

Figure 7:
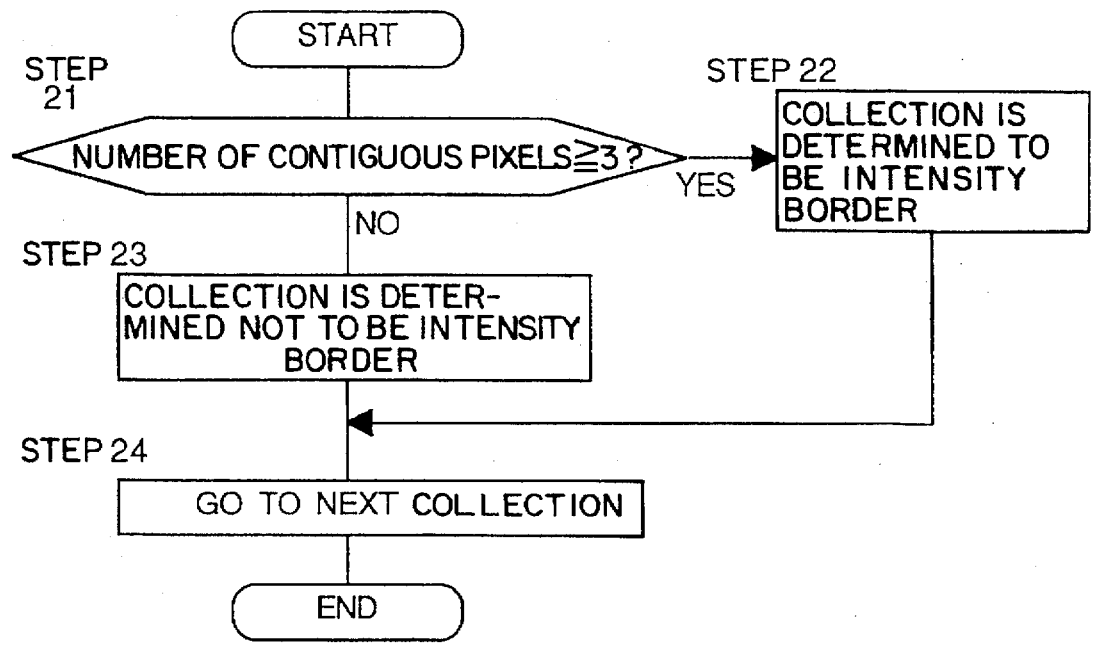
FIG. 7 is a flowchart of a process when the intensity border is determined in the embodiment.
Figure 8:
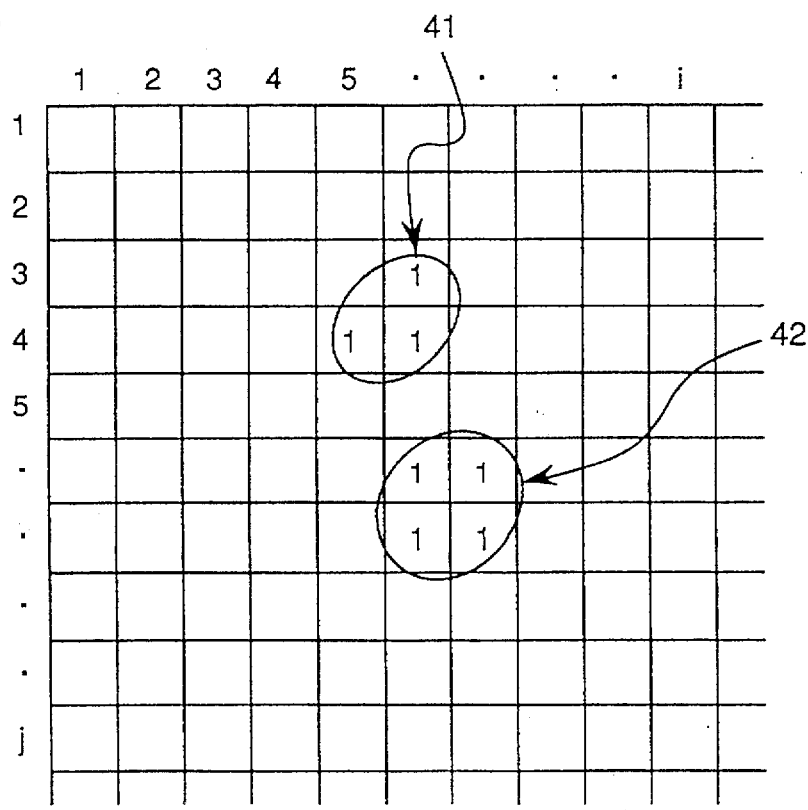
FIG. 8 is a diagram explanatory of the state after the process of FIG. 7.
Figures 9, 10:
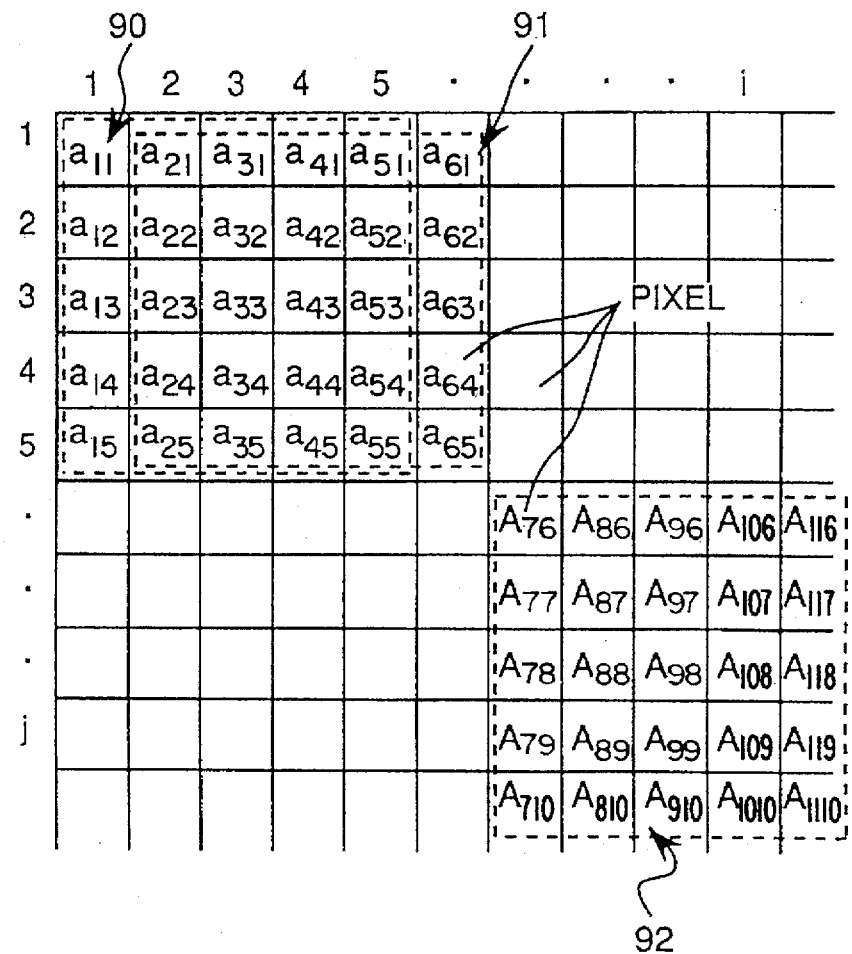
FIG. 9 is a diagram of a partial image in the prior art.
FIG. 10 is a diagram of an example of a coefficient matrix in the prior art.

Since the intensity change has some length, the decision may be more sure if it is decided that the pixels constitute the intensity change when at least three target pixels are adjacent to each other. In such a case, the process will be executed in accordance with the flowchart of FIG. 7. A determination is made at step #21 as to whether the number of contiguous pixels is three or more at each of the collections of intensity changes 41–43 in FIG. 6. If the number is equal to or more than 3 at step #21, the collection is determined at step #22 to be the intensity border, and then the program proceeds to step #24. If the number is smaller than 3 at step #21, the collection is determined not to be an intensity border (changed to be represented by a "0") at step #23. Then, the program proceeds to step #24, so that the next collection of intensity changes is processed. The correct pixels as the composing factor of the intensity changes are as indicated in FIG. 8.

In the foregoing embodiment, the partial image is set by sequentially shifting every one pixel right or downward, that is, the image is finely scanned. However, the image may be scanned by shifting every other pixel (or every three pixels) right or downward to set the partial image depending on the image, whereby the processing time is reduced. Moreover, although the intensity change is determined from the number of contiguous pixels, it may be determined by the shape of the contiguous pixels.

According to the method of detecting an intensity change of the present invention, a partial image composed of both a target pixel and its peripheral pixels is set, and the ratio of the calculating result of the intensity data of a specific area in the partial image to the calculating result of the intensity data of the remaining area in the partial image is obtained. Therefore, the influences of the broad intensity changes can be eliminated, without requiring a complicated algorithm. At the same time, since the intensity data of pixels which are contiguous to the target pixel is also taken into consideration, noise is not extracted. Accordingly, the intensity changes can be extracted with remarkable reliability.

According to the deciding method of detecting a collection of intensity changes of the present invention, the intensity change is identified while the continuity of the extracted pixels with the influences of the broad intensity change removed is taken into consideration. Therefore, the collection of intensity changes can be identified properly.

Although the present invention has been fully described in connection with the preferred embodiment thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A method for extracting pixels constituting an intensity change formed of a collection of local intensity changes present in a gray image of an object based on intensity data of each pixel, the method comprising steps of:

setting a partial image having a specific area and a remaining area, the partial image being set with a predetermined shape and a predetermined size in the gray image and including a target pixel whose entire periphery is surrounded by adjacent pixels;

calculating intensity data belonging to the specific area which is composed of the target pixel and peripheral pixels and calculating intensity data belonging to the remaining area of the partial image;

obtaining a ratio of the calculating results between the intensity data belonging to the specific area of the partial image and the intensity data of the remaining area of the partial image; and comparing the obtained ratio with a threshold value, and then determining if the target pixel is a pixel constituting an intensity change based on a compared result, and then extracting pixels which have been determined to constitute the intensity change.

2. The extracting method as claimed in claim 1, wherein in the calculating step, an average value of the intensity data belonging to the specific area and an average value of the intensity data belonging to the remaining area are calculated.

3. The extracting method as claimed in claim 1, wherein in the calculating step, a mode of the intensity data belonging to the specific area and a mode of the intensity data belonging to the remaining area are selected.

4. The extracting method as claimed in claim 1, wherein in the calculating step, the maximum value of the intensity data belonging to the specific area and the minimum value of the intensity data belonging to the remaining area are selected.

5. The extracting method as claimed in claim 1, wherein the partial image includes another area which fails to belong to either the specific area or the remaining area of the partial image.

6. The extracting method as claimed in claim 1, wherein as the partial image, a square partial image in 5×5 matrix type composed of a target pixel and the surrounding 24 pixels is used.

7. The extracting method as claimed in claim 1, further comprising, before the partial image setting step, a step of photographing the object by an image photographing device to obtain the gray image of the object represented by the intensity data of pixels.

8. The extracting method as claimed in claim 7, wherein in the calculating step, an average value of the intensity data belonging to the specific area of the partial image and an average value of the intensity data belonging to the remaining area of the partial image are calculated.

9. The extracting method as claimed in claim 7, wherein in the calculating step, a mode of the intensity data belonging to the specific area of the partial image and a mode of the intensity data belonging to the remaining area of the partial image are selected.

10. The extracting method as claimed in claim 7, wherein in the calculating step, the maximum value of the intensity data belonging to the specific area of the partial image and the minimum value of the data belonging to the remaining area of the partial image are selected.

11. The extracting method as claimed in claim 7, wherein the partial image includes another area which fails to belong to either the specific area or the remaining area of the partial image.

12. The extracting method as claimed in claim 7, wherein as the partial image, a square partial image in 5×5 matrix type composed of a target pixel and the surrounding 24 pixels is used.

13. A method for extracting pixels constituting an intensity change formed of a collection of local intensity changes present in a gray image of an object based on intensity data of each pixel and then identifying, in the extracted pixels, a group of contiguous pixels constituting the intensity change present as a collection of intensity changes, the method comprising steps of:

setting a partial image having a specific area and a remaining area, the partial image being set with a predetermined shape a predetermined size in the gray image and including a target pixel whose entire periphery is surrounded by adjacent pixels;

calculating intensity data belonging to the specific area which is composed of the target pixel and peripheral pixels and calculating intensity data belonging to the remaining area of the partial image;

obtaining a ratio of the calculating results between the intensity data belonging to the specific area of the partial image and the intensity data of the remaining area of the partial image; and comparing the obtained ratio with a threshold value, and then determining if the target pixel is a pixel constituting an intensity change based on a compared result, and then extracting pixels which have been determined to constitute the intensity change;

identifying, in the extracted pixels constituting the intensity change, the group of contiguous pixels which are contiguously present; and identifying a group of at least a predetermined number of contiguous pixels in the detected group as the collection of intensity change.

14. The extracting and deciding method as claimed in claim 13, wherein the predetermined number is three.

15. The extracting and deciding method as claimed in claim 13, further comprising, before the partial image setting step, a step of photographing the object by an image photographing device to obtain the gray image of the object represented by the intensity data of pixels.

16. The extracting method as claimed in claim 13, wherein in the calculating step, an average value of the intensity data belonging to the specific area of the partial image and an average value of the intensity data belonging to the remaining area of the partial image are calculated.

17. The extracting method as claimed in claim 13, wherein in the calculating step, a mode of the intensity data belonging to the specific area of the partial image and a mode of the intensity data belonging to the remaining area of the partial image are selected.

18. The extracting method as claimed in claim 13, wherein in the calculating step, the maximum value of the intensity data belonging to the specific area of the partial image and the minimum value of the intensity data belonging to the remaining area of the partial image are selected.

19. The extracting method as claimed in claim 13, wherein the partial image includes another area which fails to belong to either the specific area or the remaining area of the partial image.

* * * * *